Patented Sept. 16, 1952

2,610,384

UNITED STATES PATENT OFFICE 2,610,384

PROCESS OF PRODUCING A TEXTILE PRODUCT

Ralph James Mann and Józef Biedawski, Spondon, near Derby, England, assignors to British Celanese Limited, a corporation of Great Britain No Drawing. Application November 17, 1949, Serial No. 127,996. In Great Britain December 3, 1948

8 Claims. (Cl. 28—73)

1

This invention relates to improvements in the production of sheet materials and is, more particularly, concerned with the production of insulating materials comprising fibrous substances in sheet form.

Prior United Kingdom Patent No. 582,006 of British Celanese Limited describes and claims a process for the production of batting having a basis of staple fibres, the process comprising forming a layer of interlaced and matted staple fibres, of which a substantial proportion are thermoplastic, and forming a skin on both sides of said layer by causing the thermoplastic fibres at or near the surfaces of the layer to become adhesive and to stick to one another solely by the action of heat and pressure and/or of a solvent or softening agent for the material of which the thermoplastic fibres consist, while leaving unaffected the thermoplastic fibres in the body of the layer. This process enables insulating materials, useful particularly for heat and sound insulation purposes, which are of a self-supporting structure to be obtained in quite a satisfactory manner. The process described, however, in which heat is applied to the thermoplastic fibres by contact with a heating surface, does necessitate very careful control of the application of heat and pressure or, where this is used, of the solvent, and this control is difficult to obtain where it is desired to form only a very thin skin on the fibrous materials.

According to the present invention, a skin is formed on a mass of fibrous material comprising a substantial proportion of thermoplastic fibres by exposing the mass of fibrous material to radiant heat and terminating the exposure when the fibres have been rendered adhesive thereby to the desired depth in the mass. It has been found that it is possible in this way to form a skin upon the mass of fibrous material, and that it is possible so to control the radiant heat as to produce, if desired, only an exceedingly thin skin on the materials, so thin indeed as to produce very little effect upon the appearance of the materials. The process of the invention may be employed to produce, successively or simultaneously, skins on both sides of a batting. In this way products can be obtained which can be cut into pieces of any desired shape without showing signs of disintegration. Such a product is useful not only for heat and sound insulation but also in making shoulder pads and similar articles for use in wearing apparel.

In forming the skin on the batting, the amount of heat applied to the surface of the materials can be controlled both by controlling the temperature of the radiating surface and also by choice of a suitable distance between the radiating surface and the material being heated. In addition, the time during which heating is applied naturally has a substantial effect upon the result obtained. In practice it has been found that the application of too much heat tends to produce shrinkage of the surface fibres, while still more intensive heating results in the production of fused lumps of the thermoplastic material. According to an important feature of the invention, the fibrous material is subjected to the action of radiant heat while it is held under slight pressure by a metal gauze through which the radiant heat is applied. The action of the metal gauze appears to be such as to prevent the shrinkage of the surface fibres so that a sufficient fusion of these fibres can take place to produce a satisfactory skin without cockling of the material or the production of fused lumps of thermoplastic material. Preferably the gauze used is of quite thin wire, e. g. of less than 20 mils diameter, and of small mesh, e. g. more than 20 meshes per inch. Gauze of 30 to 40 meshes per inch made from wire of 8 to 10 mils diameter has given excellent results.

Better results are sometimes obtained by applying the radiant heat for a number of short periods separated by cooling periods than is the case if the material is merely maintained for an uninterrupted period under the influence of the radiant heat until a surface skin is formed.

In carrying out the process of the invention, a layer of interlaced and matted staple fibres, of which a substantial proportion are thermoplastic, is first formed and then subjected, as a continuous sheet or as separate lengths of the material, to the action of radiant heat until a suitable skin has been produced. In such a process separate lengths of the material may be exposed to a radiant heating unit of suitable area or the material, in separate lengths or as a continuous sheet, may be passed continuously beneath a radiant heating unit one or more times or successively beneath a number of such units spaced apart. Surface combustion plates capable of being heated to a temperature of about 900° C., say from 750° to 950° C., have been found to be generally useful for the purposes of the invention. Electrical radiant heating devices may, however, be employed. The time during which the material is exposed to such a heating unit depends, of course, upon the melting point of the thermoplastic fibres used and the distance from the heating unit at which the material is heated. Generally it is preferred to use a short heating period close to the heating unit, rather than a longer heating period at a greater distance.

Cellulose acetate fibres are in ready supply and the invention is, therefore, of particular importance as applied to materials in which the thermoplastic content consists of these fibres. With cellulose acetate fibres a satisfactory thin skin is formed by a surface combustion plate at about 900° C. situated about 2 inches from the material using a heating time of little more than one second, e. g. one to one and a half seconds, and repeating this treatment 2 to 4 times, for instance by passage at a suitable speed beneath 2 to 4 such plates, or by passage 2 to 4 times beneath a single plate. If desired, however, a longer heating time may be used, e. g. 5 or 10 seconds per passage to a total of, say, one minute, or even a total heating time of 2 or more minutes, especially where a thicker skin is required. In these cases, however, it is desirable to operate at a greater distance from the heating unit, e. g. 3, 4, 5 or more inches therefrom.

As above indicated, the process of the invention is of particular importance as applied to the treatment of fibrous materials in which the thermoplastic fibres are made of cellulose acetate. However, thermoplastic fibres other than cellulose acetate may be employed, for example fibres of other cellulose esters, e. g. cellulose propionate, and mixed esters, such as cellulose acetate propionate and cellulose acetate butyrate, cellulose ethers such as ethyl cellulose and benzyl cellulose, synthetic linear polyamide condensation products, polymeric vinyl halides or vinyl esters of organic acids, copolymers of such vinyl esters and vinyl halides, polymerised methacrylic acid esters and the like. The fibrous material treated may consist wholly of thermoplastic fibres or may contain fibres which are not thermoplastic, for instance fibres of cotton, silk, wool, regenerated cellulose, jute and hemp. Such nonthermoplastic fibres, if employed, preferably constitute only a small proportion, about 20% or less, of the total fibres.

The following example illustrates the process of the invention:

*Example*

A batting consisting of a loose mass of interlaced cellulose acetate fibres is passed, while lightly compressed by a wire gauze of 34 mesh constructed from wire of 9 mils diameter, beneath a succession of four surface combustion plates, the radiant surfaces of which are situated 2 inches from the wire gauze and heated to about 900° C. The plates, which extend across the width of the batting, are each about a foot long and are separated from each other by a distance of about 2 feet. The batting is thus exposed to four heating periods of about 1½ seconds each interrupted by cooling periods of about 3 seconds each.

The product has a thin coherent and uniform skin upon its surface. Subsequent or simultaneous formation in the same way of a skin on the other side of the batting produces a product which can be cut into pieces of any desired shape without showing any signs of disintegration.

Having described our invention, what we desire to secure by Letters Patent is:

1. Method of forming a skin on a mass of fibrous material comprising a substantial proportion of thermoplastic fibres, which comprises slightly compressing the mass, the pressure on at least one of the faces of the mass being applied along intersecting closely spaced lines, and applying radiant heat upon the exposed parts of said face between said intersecting portions for a period sufficient to cause a layer of the thermoplastic fibers to become adhesive, terminating said exposure before the inner fibres become adhesive, allowing the exposed fibres to cool sufficiently to set and afterwards removing the pressure.

2. Method of forming a skin on a mass of fibrous material comprising a substantial proportion of thermoplastic fibres, which comprises slightly compressing the mass, the pressure on at least one of the faces of the mass being applied along intersecting portions each less than 20 mils in width and spaced with a greater frequency than 20 per inch, and applying radiant heat upon the exposed parts of said face between said intersecting portions for a period sufficient to cause a layer of the thermoplastic fibres to become adhesive, terminating said exposure before the inner fibres become adhesive, allowing the exposed fibres to cool sufficiently to set and afterwards removing the pressure.

3. Method of forming a skin on a mass of fibrous material comprising a substantial proportion of thermoplastic fibers, which comprises slightly compressing the mass, the pressure on at least one of the faces of the mass being applied along intersecting portions each 8 to 10 mils in width and spaced with a frequency of 30 to 40 per inch, and applying radiant heat upon the exposed parts of said face between said intersecting portions for a period sufficient to cause a layer of the thermoplastic fibers to become adhesive, terminating said exposure before the inner fibres become adhesive, allowing the exposed fibres to cool sufficiently to set and afterwards removing the pressure.

4. Method of forming a skin on a mass of fibrous material comprising a substantial proportion of thermoplastic fibres, which comprises slightly compressing the mass, the pressure on at least one of the faces of the mass being applied along intersecting portions each 8 to 10 mils in width and spaced with a frequency of 30 to 40 per inch, and applying radiant heat upon the exposed parts of said face between said intersecting portions for a succession of short periods so as to cause a layer of the thermoplastic fibres to become adhesive, terminating said exposure before the inner fibres become adhesive, allowing the exposed fibres to cool sufficiently to set and afterwards removing the pressure.

5. Method of forming a skin on a mass of fibrous material comprising a substantial proportion of cellulose acetate fibres, which comprises slightly compressing the mass, the pressure on at least one of the faces of the mass being applied along intersecting closely spaced lines, and applying radiant heat upon the exposed parts of said face between said intersecting portions for a period sufficient to cause a layer of the cellulose acetate fibres to become adhesive, terminating said exposure before the inner fibres become adhesive, allowing the exposed fibres to cool sufficiently to set and afterwards removing the pressure.

6. Method of forming a skin on a mass of fibrous material comprising a substantial proportion of cellulose acetate fibres, which comprises slightly compressing the mass, the pressure on at least one of the faces of the mass being applied along intersecting portions each less than 20 mils in width and spaced with a greater frequency than 20 per inch, and applying radiant heat upon the exposed parts of said face between said intersecting portions for a period sufficient to cause a layer of the cellulose acetate fibres to become adhesive, terminating said exposure before the inner fibres become adhesive, allowing the exposed fibres to cool sufficiently to set and afterwards removing the pressure.

7. Method of forming a skin on a mass of fibrous material comprising a substantial proportion of cellulose acetate fibres, which comprises slightly compressing the mass, the pressure on at least one of the faces of the mass being applied along intersecting portions each 8 to 10 mils in width and spaced with a frequency of 30 to 40 per inch, and applying radiant heat upon the exposed parts of said face between said intersecting portions for a period sufficient to cause a layer of the cellulose acetate fibres to become adhesive, terminating said exposure before the inner fibres become adhesive, allowing the exposed fibres to cool sufficiently to set and afterwards removing the pressure.

8. Method of forming a skin on a mass of fibrous material comprising a substantial proportion of cellulose acetate fibres, which comprises slightly compressing the mass, the pressure on at least one of the faces of the mass being applied along intersecting portions each 8 to 10 mils in width and spaced with a frequency of 30 to 40 per inch, and applying radiant heat upon the exposed parts of said face between said intersecting portions for a succession of short periods so as to cause a layer of the cellulose acetate fibres to become adhesive, terminating said exposure before the inner fibres become adhesive, allowing the exposed fibres to cool sufficiently to set and afterwards removing the pressure.

RALPH JAMES MANN.
JÓZEF BIEDAWSKI.

REFERENCES CITED

The following references are of record in the file of this patent:

UNITED STATES PATENTS

| Number | Name | Date |
|---|---|---|
| 2,417,453 | Wade | Mar. 18, 1947 |
| 2,433,965 | Upson | Jan. 6, 1948 |
| 2,483,404 | Francis | Oct. 4, 1949 |
| 2,497,117 | Dreyfus | Feb. 14, 1950 |
| 2,544,797 | Lippman | Mar. 13, 1951 |

FOREIGN PATENTS

| Number | Country | Date |
|---|---|---|
| 582,006 | Great Britain | Nov. 1, 1946 |